(12) United States Patent
Dick

(10) Patent No.: US 7,792,602 B2
(45) Date of Patent: Sep. 7, 2010

(54) MATERIAL PROCESSING SYSTEM AND A MATERIAL PROCESSING METHOD INCLUDING A SAW STATION AND AN INTERFACE WITH TOUCH SCREEN

(75) Inventor: Spencer B. Dick, Portland, OR (US)

(73) Assignee: Precision Automation, Inc., Vancouver, WA (US)

( * ) Notice: Subject to any disclaimer, the term of this patent is extended or adjusted under 35 U.S.C. 154(b) by 67 days.

(21) Appl. No.: 11/895,285

(22) Filed: Aug. 22, 2007

(65) Prior Publication Data

US 2008/0109101 A1 May 8, 2008

Related U.S. Application Data

(60) Provisional application No. 60/839,661, filed on Aug. 22, 2006.

(51) Int. Cl.
*G06F 19/00* (2006.01)
*B23Q 15/00* (2006.01)
*B23Q 16/00* (2006.01)
*B26D 1/18* (2006.01)

(52) U.S. Cl. .................. 700/180; 700/96; 700/114; 700/186; 700/190; 144/356; 144/382; 83/483

(58) Field of Classification Search ................ 700/96, 700/114, 180, 186, 190; 144/356, 382; 83/483
See application file for complete search history.

(56) References Cited

U.S. PATENT DOCUMENTS

| 305,563 | A | 9/1884 | Baer |
|---|---|---|---|
| 491,307 | A | 2/1893 | Gaylord |
| 691,715 | A | 1/1902 | Dodd |
| 751,121 | A | 2/1904 | Tidey |
| 867,081 | A | 9/1907 | Robinson |
| 935,206 | A | 9/1909 | Holdeman |
| 957,782 | A | 5/1910 | Leaver, Jr. |
| 1,123,711 | A | 1/1915 | Driscoll |
| 1,271,473 | A | 7/1918 | Johnson |
| 1,324,587 | A | 12/1919 | Elliott |
| 1,461,425 | A | 7/1923 | Linebaugh |
| 1,569,649 | A | 1/1926 | Way |
| 1,924,326 | A | 8/1933 | MacFadden |
| 1,969,503 | A | 8/1934 | Eksergian |

(Continued)

FOREIGN PATENT DOCUMENTS

JP    55-122933    9/1980

OTHER PUBLICATIONS

"TigerStop Application Guide". Application Guide for PF90 Computer Controlled Saw. Precision Automation Inc. 2005.

(Continued)

*Primary Examiner*—Ramesh B Patel
(74) *Attorney, Agent, or Firm*—Kolisch Hartwell, P.C.

(57) ABSTRACT

A material processing system includes an apparatus having a processing path. A saw station is located along the processing path. A positioner is configured to push a trailing end of a work piece along the processing path toward the saw station. A computer is connected to the apparatus, and programmed to provide a digital interface allowing an operator to control operation of the apparatus through the interface.

15 Claims, 4 Drawing Sheets

U.S. PATENT DOCUMENTS

| | | |
|---|---|---|
| 1,991,431 A | 2/1935 | Tyler |
| 2,108,823 A | 2/1938 | Lyon |
| 2,112,789 A | 3/1938 | Ross |
| 2,166,703 A | 7/1939 | Boice |
| 2,200,894 A | 5/1940 | Rasmussen |
| 2,265,335 A | 12/1941 | Aumann |
| 2,315,458 A | 3/1943 | Sellmeyer |
| 2,316,971 A | 4/1943 | Overacker et al. |
| 2,325,082 A | 7/1943 | Tautz |
| 2,346,388 A | 4/1944 | Peebles |
| 2,485,274 A | 10/1949 | Garrett |
| 2,518,728 A | 8/1950 | Snow |
| 2,520,837 A | 8/1950 | Hammond |
| 2,562,246 A | 7/1951 | Van Dam et al. |
| 2,577,766 A | 12/1951 | Johnson et al. |
| 2,602,477 A | 7/1952 | Kniff |
| 2,606,413 A | 8/1952 | Gray |
| 2,613,243 A | 10/1952 | Frear |
| 2,618,300 A | 11/1952 | Freudenthaler |
| 2,619,134 A | 11/1952 | West |
| 2,630,845 A | 3/1953 | Eschenburg |
| 2,731,989 A | 1/1956 | Valcourt et al. |
| 2,740,437 A | 4/1956 | Odlum et al. |
| 2,747,625 A | 5/1956 | Small |
| 2,754,859 A | 7/1956 | Ocenasek |
| 2,806,493 A | 9/1957 | Gaskell |
| 2,852,049 A | 9/1958 | Peterson |
| 2,890,729 A | 6/1959 | Horn |
| 2,962,063 A | 11/1960 | Gussler |
| 3,019,823 A | 2/1962 | Cornell |
| 3,059,674 A | 10/1962 | Boling |
| 3,089,716 A | 5/1963 | Berkowitz |
| 3,095,673 A | 7/1963 | Born et al. |
| 3,163,065 A | 12/1964 | Kolodgy et al. |
| 3,170,736 A | 2/1965 | Wright |
| 3,186,453 A | 6/1965 | Green |
| 3,194,100 A | 7/1965 | Fehlberg |
| 3,257,756 A | 6/1966 | Mealer |
| 3,293,971 A | 12/1966 | Kuss |
| 3,315,716 A | 4/1967 | Mytinger |
| 3,329,181 A | 7/1967 | Buss et al. |
| 3,391,717 A | 7/1968 | Melin |
| 3,459,246 A | 8/1969 | Ottosson |
| 3,466,958 A | 9/1969 | Munson |
| 3,483,904 A | 12/1969 | Jacumin |
| 3,566,239 A | 2/1971 | Taniguchi |
| 3,584,284 A | 6/1971 | Beach |
| 3,606,699 A | 9/1971 | Robinson, Jr. |
| 3,610,299 A | 10/1971 | Jureit et al. |
| 3,687,178 A | 8/1972 | Golick et al. |
| 3,716,716 A | 2/1973 | Marantette et al. |
| 3,730,042 A | 5/1973 | Price |
| 3,736,968 A | 6/1973 | Mason |
| 3,738,403 A | 6/1973 | Schwoch |
| 3,738,504 A | 6/1973 | Vail et al. |
| 3,762,524 A | 10/1973 | Anderson |
| 3,766,815 A | 10/1973 | Edixhoven |
| 3,775,906 A | 12/1973 | Dougherty |
| 3,780,777 A | 12/1973 | Davies |
| 3,797,171 A | 3/1974 | Farmer |
| 3,807,269 A | 4/1974 | Mertes |
| 3,811,353 A | 5/1974 | Miles |
| 3,812,947 A * | 5/1974 | Nygaard .................... 198/617 |
| 3,814,153 A | 6/1974 | Schmidt |
| 3,841,462 A | 10/1974 | Schmidt |
| 3,854,889 A | 12/1974 | Lemelson |
| 3,885,483 A | 5/1975 | Ikeya |
| 3,886,372 A | 5/1975 | Sanglert |
| 3,910,142 A | 10/1975 | Jureit |
| 3,917,078 A | 11/1975 | Schmidt |
| 3,941,019 A | 3/1976 | Baldwin et al. |
| 3,943,808 A | 3/1976 | Pryor |
| 3,988,860 A | 11/1976 | Nevarez |
| 3,994,484 A | 11/1976 | Schorr |
| 4,026,536 A | 5/1977 | Netto |
| 4,055,097 A | 10/1977 | Ducret |
| 4,111,088 A | 9/1978 | Ziegelmeyer |
| 4,143,571 A | 3/1979 | Oxenham |
| 4,144,449 A | 3/1979 | Funk et al. |
| 4,170,911 A | 10/1979 | Ayers et al. |
| 4,194,267 A | 3/1980 | Johnson et al. |
| 4,206,910 A | 6/1980 | Biesemeyer |
| 4,207,472 A | 6/1980 | Idelsohn |
| 4,219,061 A | 8/1980 | Duggins |
| 4,221,974 A | 9/1980 | Mueller et al. |
| 4,243,081 A | 1/1981 | Pritelli |
| 4,256,000 A | 3/1981 | Seildel |
| 4,260,001 A | 4/1981 | De Muynck |
| 4,286,880 A | 9/1981 | Young |
| 4,313,281 A | 2/1982 | Richmond |
| 4,331,050 A | 5/1982 | Gergek |
| 4,358,166 A | 11/1982 | Antoine |
| 4,366,649 A | 1/1983 | Weigant |
| 4,410,025 A | 10/1983 | Sicotte |
| 4,434,693 A | 3/1984 | Hosoi |
| 4,453,838 A | 6/1984 | Loizeau |
| 4,454,794 A | 6/1984 | Thornton |
| 4,469,318 A | 9/1984 | Slavic |
| 4,472,783 A | 9/1984 | Johnstone et al. |
| 4,475,312 A | 10/1984 | Deutschle |
| 4,495,730 A | 1/1985 | Kennedy |
| 4,499,933 A | 2/1985 | Thompson |
| 4,520,592 A | 6/1985 | Holloway |
| 4,521,006 A | 6/1985 | Waters |
| 4,541,722 A | 9/1985 | Jenks |
| 4,596,172 A | 6/1986 | Visser |
| 4,627,321 A | 12/1986 | Moore |
| 4,628,459 A | 12/1986 | Shinohara et al. |
| 4,635,515 A | 1/1987 | Altman |
| 4,639,653 A | 1/1987 | Anderson et al. |
| 4,641,557 A | 2/1987 | Steiner et al. |
| 4,658,687 A | 4/1987 | Haas et al. |
| 4,682,894 A | 7/1987 | Schmidt |
| 4,691,607 A | 9/1987 | Webb |
| 4,693,158 A | 9/1987 | Price |
| 4,694,871 A | 9/1987 | Jenkner |
| 4,702,134 A | 10/1987 | Corley, III |
| 4,725,961 A | 2/1988 | Pearl |
| 4,736,511 A | 4/1988 | Jenkner |
| 4,750,105 A | 6/1988 | Ohkawa et al. |
| 4,760,870 A | 8/1988 | Speck |
| 4,788,481 A | 11/1988 | Niwa |
| 4,791,757 A | 12/1988 | Orlando |
| 4,792,889 A | 12/1988 | Kragelin et al. |
| 4,794,963 A | 1/1989 | Oppeneer |
| 4,805,505 A | 2/1989 | Cantlin |
| 4,830,075 A | 5/1989 | Jenkner |
| 4,866,630 A | 9/1989 | Beaman et al. |
| 4,874,996 A | 10/1989 | Rosenthal |
| 4,878,524 A | 11/1989 | Rosenthal et al. |
| 4,879,752 A | 11/1989 | Aune et al. |
| 4,887,219 A | 12/1989 | Strauser |
| 4,896,273 A | 1/1990 | Moore et al. |
| 4,901,992 A | 2/1990 | Dobeck |
| 4,939,379 A | 7/1990 | Horn |
| 4,939,635 A | 7/1990 | Seki et al. |
| 4,939,739 A | 7/1990 | Hobart et al. |
| 4,945,797 A | 8/1990 | Hahn |
| 4,946,149 A | 8/1990 | Greene |
| 4,949,605 A | 8/1990 | Geller |
| 4,964,450 A | 10/1990 | Hughes et al. |
| 4,968,011 A | 11/1990 | Womack |
| 4,972,749 A | 11/1990 | Grove |
| 5,001,955 A | 3/1991 | Fujiwara |

| | | | | | | |
|---|---|---|---|---|---|---|
| 5,014,583 | A | 5/1991 | Webb | 6,646,564 B1 | 11/2003 | Azieres | |
| 5,018,562 | A | 5/1991 | Adams | 6,675,685 B2 | 1/2004 | Ceroll et al. | |
| 5,042,341 | A | 8/1991 | Greten et al. | 6,681,140 B1 | 1/2004 | Heil | |
| 5,054,938 | A | 10/1991 | Ide | 6,690,990 B1 | 2/2004 | Caron et al. | |
| 5,058,474 | A | 10/1991 | Herrera | 6,701,259 B2 | 3/2004 | Dor et al. | |
| 5,085,414 | A | 2/1992 | Weaver | 6,735,493 B1 | 5/2004 | Chou et al. | |
| 5,094,282 | A | 3/1992 | Suzuki et al. | 6,764,434 B1 | 7/2004 | Volk | |
| 5,119,855 | A | 6/1992 | Knighten et al. | 6,880,442 B2 | 4/2005 | Duginske | |
| 5,142,158 | A | 8/1992 | Craig, Jr. | 6,886,462 B2 | 5/2005 | Dick et al. | |
| 5,176,060 | A | 1/1993 | Thornton | 6,898,478 B2 * | 5/2005 | Dick et al. | 700/171 |
| 5,181,446 | A | 1/1993 | Theising | 6,898,487 B2 | 5/2005 | Bacchi | |
| 5,197,172 | A | 3/1993 | Takagi et al. | 6,918,329 B2 | 7/2005 | Dick | |
| 5,201,258 | A | 4/1993 | Cremona | 6,941,864 B2 * | 9/2005 | Dick et al. | 101/483 |
| 5,201,351 | A | 4/1993 | Hurdle, Jr. | 6,980,874 B2 | 12/2005 | Cribbs | |
| 5,209,165 | A | 5/1993 | Foan | 7,021,096 B2 | 4/2006 | Barnett | |
| 5,251,142 | A | 10/1993 | Cramer | 7,031,789 B1 | 4/2006 | Dick | |
| 5,254,859 | A | 10/1993 | Carman et al. | 7,073,422 B2 | 7/2006 | Dick | |
| 5,266,878 | A | 11/1993 | Makino et al. | 7,080,431 B2 | 7/2006 | Sawyer | |
| 5,293,802 | A | 3/1994 | Shiotani | 7,168,353 B2 | 1/2007 | Dick | |
| 5,301,934 | A | 4/1994 | Lynn et al. | 7,171,738 B2 * | 2/2007 | Dick et al. | 29/563 |
| 5,365,812 | A | 11/1994 | Harnden | 7,245,981 B2 | 7/2007 | Dick | |
| 5,418,729 | A * | 5/1995 | Holmes et al. ............... 700/167 | 7,428,443 B2 | 9/2008 | Dick | |
| 5,443,554 | A | 8/1995 | Robert | 7,483,765 B2 | 1/2009 | Dick | |
| 5,444,635 | A * | 8/1995 | Blaine et al. ................. 700/171 | 2002/0049565 A1 | 4/2002 | Kirila | |
| 5,452,031 | A | 9/1995 | Ducharme | 2002/0116980 A1 | 8/2002 | Kerr | |
| 5,460,070 | A | 10/1995 | Buskness | 2002/0121170 A1 | 9/2002 | Gambaro | |
| 5,472,028 | A | 12/1995 | Faulhaber | 2003/0024362 A1 | 2/2003 | Preuss | |
| 5,489,155 | A | 2/1996 | Ide | 2003/0033920 A1 | 2/2003 | Parks | |
| 5,524,514 | A | 6/1996 | Hadaway et al. | 2003/0041919 A1 | 3/2003 | Giles | |
| 5,663,882 | A | 9/1997 | Douglas | 2003/0202091 A1 | 10/2003 | Garcia | |
| 5,664,888 | A | 9/1997 | Sabin | 2004/0008319 A1 | 1/2004 | Lai | |
| RE35,663 | E | 11/1997 | Mori et al. | 2004/0027038 A1 | 2/2004 | Gaesser et al. | |
| 5,694,821 | A | 12/1997 | Smith | 2004/0109173 A1 | 6/2004 | Finarov | |
| 5,772,192 | A | 6/1998 | Hoffmann | 2004/0117058 A1 * | 6/2004 | Dick et al. ................. 700/171 |
| 5,797,685 | A | 8/1998 | Jurik et al. | 2004/0154449 A1 | 8/2004 | Parks | |
| 5,798,929 | A | 8/1998 | Stenzel et al. | 2004/0206264 A1 * | 10/2004 | Dick et al. ................. 101/483 |
| 5,829,892 | A | 11/1998 | Groves | 2004/0231112 A1 * | 11/2004 | Sawyer et al. ............ 29/407.09 |
| 5,845,555 | A | 12/1998 | Dawley | 2005/0098004 A1 * | 5/2005 | Dick et al. ..................... 83/13 |
| 5,865,080 | A | 2/1999 | Jackson | 2006/0104551 A1 | 5/2006 | Schneeberger | |
| 5,927,857 | A | 7/1999 | Ceroll | 2007/0084323 A1 | 4/2007 | Parks | |
| 5,933,353 | A | 8/1999 | Abriam et al. | 2007/0240547 A1 | 10/2007 | Dick | |
| 5,938,344 | A | 8/1999 | Sabin | 2007/0245872 A1 | 10/2007 | Kelly | |
| 5,953,232 | A | 9/1999 | Blaimschein | 2009/0100974 A1 | 4/2009 | Sawyer et al. | |
| 5,960,104 | A | 9/1999 | Conners et al. | 2009/0103977 A1 | 4/2009 | Dick | |
| 5,964,536 | A | 10/1999 | Kinoshita | 2009/0105870 A1 | 4/2009 | Dick | |
| 6,021,826 | A | 2/2000 | Daniell | 2009/0105871 A1 | 4/2009 | Dick | |
| 6,039,228 | A | 3/2000 | Stein | 2009/0105872 A1 | 4/2009 | Dick | |
| 6,052,882 | A | 4/2000 | Campbell | 2009/0299519 A1 | 12/2009 | Dick | |
| 6,058,589 | A | 5/2000 | Hakansson | | | | |
| 6,062,280 | A | 5/2000 | Newnes et al. | | | | |
| 6,095,024 | A | 8/2000 | Brutscher | | | | |
| 6,095,025 | A | 8/2000 | Mirabello | | | | |
| 6,120,628 | A | 9/2000 | Pritelli | | | | |
| 6,144,895 | A | 11/2000 | Govindaraj et al. | | | | |
| 6,216,574 | B1 | 4/2001 | Hain | | | | |
| 6,244,149 | B1 | 6/2001 | Ceroll | | | | |
| 6,263,773 | B1 | 7/2001 | McAdoo et al. | | | | |
| 6,272,437 | B1 | 8/2001 | Woods et al. | | | | |
| 6,314,379 | B1 | 11/2001 | Hu et al. | | | | |
| 6,379,048 | B1 | 4/2002 | Brissette | | | | |
| 6,390,159 | B1 | 5/2002 | Pinske | | | | |
| 6,422,111 | B1 | 7/2002 | Rousseau | | | | |
| 6,439,280 | B1 | 8/2002 | Wang | | | | |
| 6,463,352 | B1 | 10/2002 | Tadokoro et al. | | | | |
| 6,470,377 | B1 | 10/2002 | Sevcik et al. | | | | |
| 6,510,361 | B1 | 1/2003 | Govindaraj et al. | | | | |
| 6,520,228 | B1 | 2/2003 | Kennedy et al. | | | | |
| 6,549,438 | B2 | 4/2003 | Malone | | | | |
| 6,580,959 | B1 | 6/2003 | Mazumder | | | | |
| 6,594,590 | B2 | 7/2003 | Woods et al. | | | | |
| 6,618,692 | B2 | 9/2003 | Takahashi et al. | | | | |
| 6,631,006 | B2 | 10/2003 | Dick et al. | | | | |
| 6,640,855 | B2 | 11/2003 | Giles | | | | |

OTHER PUBLICATIONS

Defendant Technical Services, Inc.'s Memorandum In Support of Its Motion for Partial Summary Judgment re: Patent Infringement Claims and to Dismiss State Law Claims, D.Or., Case No. CV 07-707 AC, dated May 27, 2008 (35 pages).

Technical Services, Inc.'s Revised Invalidity Contentions, D. Or., Case No. CV 07-707 AC, dated Oct. 1, 2008 (59 pages).

TigerStop Application Guide, Precision Automation, Inc. 2000, 12 pages.

Declaration of Spencer B. Dick in Support of Supplemental Information Disclosure Statement with attached Exhibits A and B (Letter TSI to Pella dated Feb. 4, 2002 (Exhibit A) and Letter TSI to Integrity letter dated Jun. 27, 2002 (Exhibit B)).

TigerStop Manual Version 3.0, Precision Automation, Inc., Jul. 2000, 50 pages.

TigerLink 3.2 User Guide, Precision Automation, Inc. 2005, 15 pages.

The Ultimizer brochure, Ultimizers Inc. 2000, 8 pages.

The Ardis Concept, webpage printouts, Ardis Information Systems, N.V., Jun. 23, 2001, archive version, accessed Jun. 12, 2007, 8 pages.

Technical Services, Inc.'s 1985 Response to a bid request by Fruehauf Corporation, 17 pages.

Modern Woodworking, cover page and pp. 111 and 143, Aug. 2002, 3 pages.

R & R Drummond, Inc., web page printouts, Jun. 29, 2001 archive version, accessed Jun. 11, 2007, 2 pages.

Affidavit of Mark Caspers in Support of Defendant Technical Services, Inc.'s Opposition to Plaintiff's Motion for Preliminary Injunction dated Oct. 5, 2007 with Exhibits A-C describing prior sales of Mill Vision and Mill Vision XLT, D. Or, Case No. 07-707-AS.

Affidavit of Daniel J. Dew in Support of Defendant Technical Services, Inc.'s Opposition to Plaintiff's Motion for Preliminary Injunction dated Nov. 20, 2007 with Exhibits A-D describing prior sales of Mill Vision and Mill Vision XLT, D. Or., Case No. CV 07-707-AS.

Decision Granting Ex Parte Reexamination dated Apr. 14, 2006, Reexamination Control No. 90/007,925 re Patent No. 6,886,462, 8 pages.

Decision Granting Ex Parte Reexamination dated Aug. 25, 2006, Reexamination Control No. 90/007,857 re Patent No. 6,886,462, 32 pages.

Dec. 22, 2000 offer for sale Weinig's Grecon Dimter Model 104 sold to the Woodshop of Avon, 8 pages.

Letter dated Jun. 11, 2009 from Scott Johnson to Pierre Van Rysselberghe, 3 pages.

* cited by examiner

Fig. 3

| WIDTH | THICKNESS | MATERIAL | JOB | LENGTH | QUALITY | CUTS | PROGRESS |
|---|---|---|---|---|---|---|---|
| 12.500 | 0.75 | RED OAK | 5043 | 7.25 | 1 | 1 | ▨▨▨ |
| 2.5 | 0.75 | RED OAK | 5043 | 8.5 | 2 | 1 | ▨ |
| 2.5 | 0.75 | RED OAK | 5043 | 9 | 1 | 1 | ▨▨ |
| 2.5 | 0.75 | RED OAK | 5043 | 13 | 1 | 1 | ▨▨ |
| 2.5 | 0.75 | RED OAK | 5043 | 11.5 | 3 | 2 | |
| 2.5 | 0.75 | CHERRY | 5043 | 22.625 | 2 | 0 | |
| 2.5 | 0.75 | CHERRY | 5043 | 33.25 | 1 | 0 | |
| 2.5 | 0.75 | CHERRY | 5043 | 17.125 | 4 | 1 | ▨ |
| 2.5 | 0.75 | MAPLE | 5043 | 15.5 | 2 | 0 | |
| 2.5 | 0.75 | MAPLE | 5043 | 18 | 4 | 0 | |
| 2.5 | 0.75 | MAPLE | 5043 | 19.75 | 10 | 0 | |
| 2.5 | 0.75 | PINE | 5043 | 12.625 | 2 | 1 | ▨ |
| 2.5 | 0.75 | PINE | 5043 | 13.25 | 1 | 0 | |
| 2.5 | 0.75 | PINE | 5043 | 15 | 1 | 0 | |

CURRENT POSITION 12.625 IN

MATERIAL PROCESSING SYSTEM AND A MATERIAL PROCESSING METHOD INCLUDING A SAW STATION AND AN INTERFACE WITH TOUCH SCREEN

CROSS-REFERENCE TO RELATED PATENTS

This application claims priority under 35 U.S.C. §119 and applicable foreign and international law of U.S. Provisional Patent Application Ser. No. 60/839,661 filed Aug. 22, 2006 and is hereby incorporated by reference.

This application incorporates the following patent application and patents by reference in their entireties: U.S. patent application Ser. No. 10/964,553 filed Oct. 12, 2004 titled "MULTI-STEP SYSTEMS FOR PROCESSING WORKPIECES"; U.S. Pat. Nos. 6,886,462; 7,031,789; 491,307; 2,315,458; 2,731,989; 2,740,437; 2,852,049; 3,994,484; 4,111,088; 4,434,693; 4,658,687; 4,791,757; 4,805,505; 4,901,992; 5,251,142; 5,443,554; 5,444,635; 5,460,070; 5,524,514; and 6,216,574.

FIELD

The invention relates to product manufacturing. In particular, the invention involves digital management of manufacturing projects.

BACKGROUND

Production facilities typically need to process materials in batches. For example, it may be necessary to cut wood in varying dimensions to build a cabinet system or a furniture item. The list of wood dimensions required to build the product may be referred to as a "cut list" or a "cutting bill". Optimization programs are typically used in the industry to determine efficient cutting routines to satisfy cut lists based on raw material dimensions, defects, etc. There is a need for further improvements in the controller interface features used by operators to perform repetitive processing steps and operations.

THE FIGURES

FIG. 3 is a display view of a cut list in a spreadsheet format.

DESCRIPTION

Figure 1:
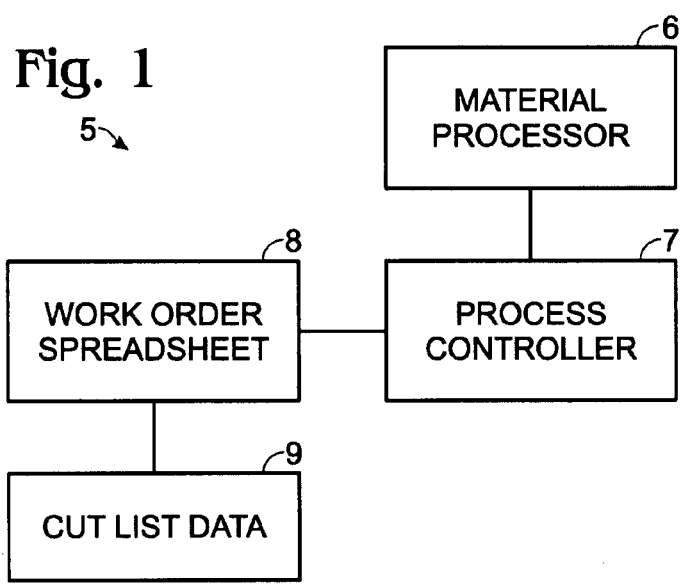
FIG. 1 is a flow chart showing components of a material processing system.

FIG. 1 is a flow chart showing relationships between various components of a material processing system 5. Material processor 6 includes equipment configured to manipulate materials prior to assembling a final product. For example, material processor 6 includes any combination of components described in U.S. Pat. No. 6,886,462, hereby incorporated by reference in its entirety. Processor 6 may include one or more processing stations. A processing station may include a saw for cutting lengths, widths, or features in a workpiece. Work stations may also include numerous other devices for manipulating a workpiece in accordance with the description in U.S. patent application Ser. No. 10/964,553, which is hereby incorporated by reference in its entirety.

Processor 6 may also include a pushing device for moving a workpiece along a processing path relative to one or more workstations. A mechanism for inputting data relating to location of features on a workpiece such as defects may also be provided. For example, marking devices such as those described in U.S. Pat. No. 7,073,422 may be used. Alternatively, or in addition, a measuring device for inputting data may include an encoder-based measuring device that an operator can slide parallel to the length of a workpiece and selectively actuate, for example, by pushing a button, to send information about the relative position of the workpiece ends, one or more defects, and/or other workpiece features to the controller.

Material processor 6 receives instructions from an operator through process control interface 7. Process controller 7 may include an interface which enables customizable button fields on a screen display, as described in more detail below. Process controller 7 may work in conjunction with work order spreadsheet display 8 which may be a digitally-generated display screen at least partially resembling a cut list on a conventional clipboard. Work order spreadsheet 8 may access pre-existing cut list data 9 from a digital storage device.

Figure 2:
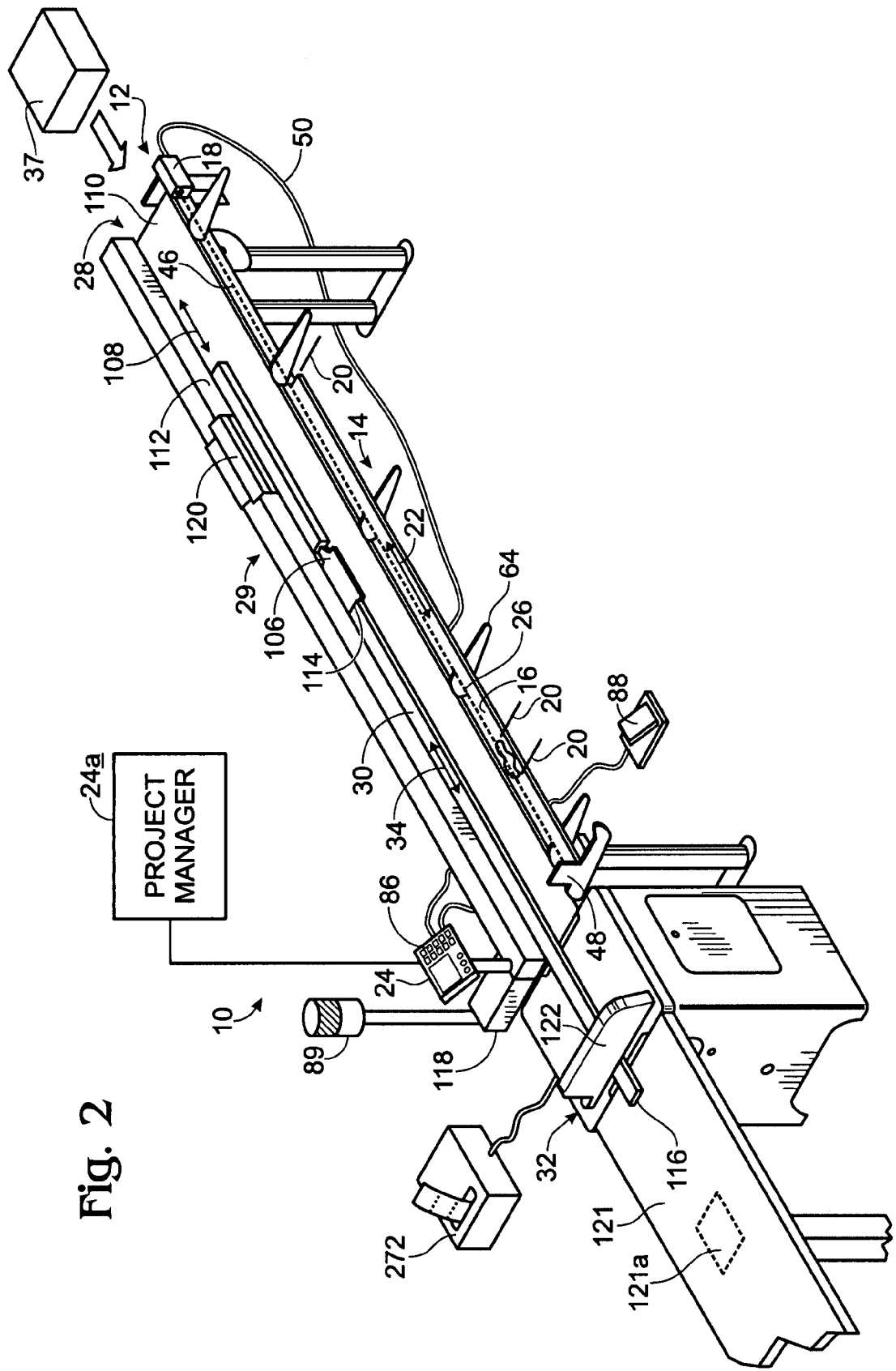
FIG. 2 is a view of an automated processing system.

An example of an automated processing system constructed in accordance with the present invention is shown generally at 10 in FIG. 2. System 10 includes a marking assembly 12 positioned along a front portion of the system. Marking assembly 12 includes a marking station 14 to orient an article or material 16 relative to an optical measuring device 18. The article may be a wood product, metal, plastic, ceramic, and/or the like. The article may have any suitable shape and size, and may be elongate to define a long axis, which also may be a processing axis.

Feature locations 20 along a processing axis 22 of material 16 may be input by a user to the optical measuring device 18, which communicates the feature locations to a controller 24. Another computer 24a may be used remotely from controller 24 to store, edit, combine, or modify cut lists prior to downloading one or more cut lists to controller 24. Marking assembly 12 allows a user to virtually mark feature locations 20 of material 16 along processing axis 22 of the material. A "virtual mark" means a noted location on a material relative to a registration point such as an end of the material or an axis, without requiring an actual physical mark on the material.

Optical measuring device 18 may provide data input for processing. The optical measuring device may send a light beam along optical path 26. As described in more detail below, this path may be altered for at least a portion of the light beam by placing an object into the light beam at a location corresponding to a perimeter region of feature location 20. Alternatively, the object may be placed at a selected location that inputs data about other structural aspects of the material or about nonstructural aspects of material processing. Controller 24 may use one or more structural aspects of the material, such as feature locations 20 and/or overall length, among others, to determine cutting sites. Structural aspects may include dimensions, defect locations, grade of material, etc. One or more structural aspects may be input optically and/or with another user interface.

Processing station 28 may be configured to process the material automatically based on the optically input data. Material processing, as used herein, may include any structural alteration of an article (a material). The structural alteration may include removing or separating a portion of the article (such as by cutting, boring, punching, routing, mortising, sanding, drilling, shearing, etc.), adding another component (such as a fastener, a colorant, a sealing agent, a connected component, etc.), forming a joint (such as by tenoning), reshaping the article (such as by stamping, compression, bending, etc.), and/or altering the strength of the article (such as by heating, electromagnetic radiation exposure, radiation treatment, etc.), among others.

Station 28 may include a positioner assembly 29, which may position previously-marked material 30, relative to a material processing device, such as a saw 32. Positioned material 30 may be processed at one or more discrete positions along processing axis 34 of material 30 by saw 32. Material processing may be based on virtually-marked feature locations 20 or other processing data supplied by the user, by deflecting a light beam, as described below. Material processing also may be in accordance with a processing list, such as a cut list, which may be stored in or otherwise accessible to controller 24.

In some embodiments, a material feeding or positioning device 37, such as a roll feeder, may be used to feed material to a material processing device, such as a saw, in processing station 28. Alternatively, a pusher mechanism may be employed to engage an end of the material and push the material relative to the processing station, particularly relative to a material processing device of the processing station. Movement of a material positioning device (and/or a material processing device) along a line defines a processing line for in-line processing of an article. Accordingly, an article may be processed at one position or a plurality of discrete positions arrayed parallel to the processing line.

As shown in the display view of FIG. 3, a work order is presented in spreadsheet format 8 in a readily understandable manner for the operator. A list of parts and quantities is organized in the same manner that an operator may be accustomed to receiving similar material in a paper format, for example, on a clipboard.

Additional features may be provided by the underlying program. For example, the operator may look at multiple conditions in a given set of columns and make calculations at the selected position. For example, a line of a cutting bill may include column headings such as: JOB NAMES, STYLE, MATERIAL, OUTSIDE EDGE, INSIDE EDGE, FINISH, PANEL RAISE, LENGTH, PART, WIDTH, QUANTITY. Based upon the style and the material width, the operator may write a function for a given part such as a rail to subtract a given value where the Material Width=x and Part Name=y, then subtract 2×Material Width.

The program also may allow sorting by columns; the ability to hide finished cuts, the ability to see progress in the cutting visually by a progressive bar at the right-hand end of each line item; the ability to touch a given line and then move to that position by hitting START; and/or the ability to see the remaining total length of parts to be cut.

Figure 4:
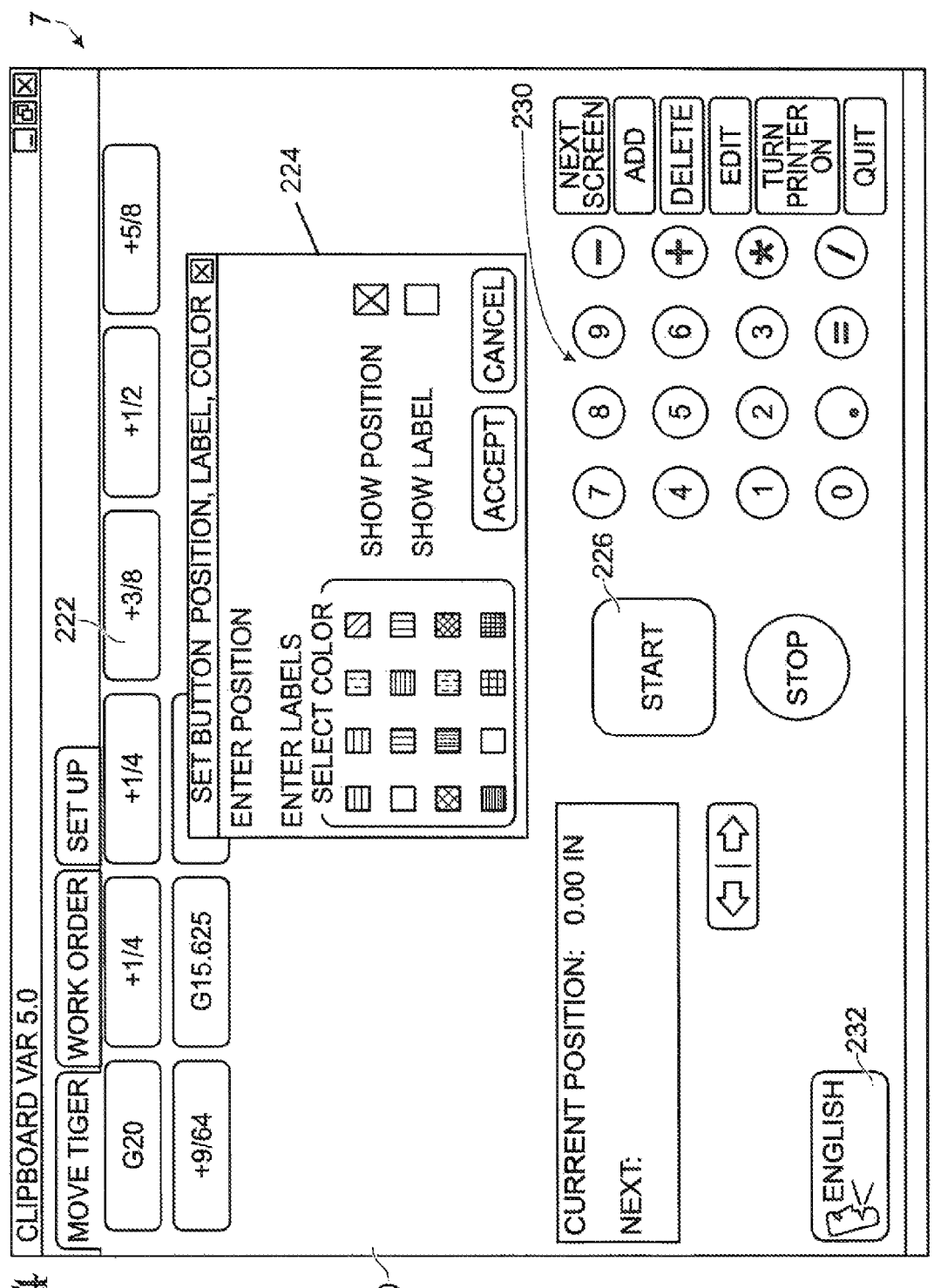
FIG. 4 is a display view of a control interface with customizable button fields.

FIG. 4 shows a display screen for process controller 7. The screen provides for basic movement of the positioner in material processor 6, with the following additional features. As shown in FIG. 4, screen 200 has a set of fields or "keys" 222, a key customizing field 224, and a numerical key Dad field 230, for use in customizing the function and appearance of the keys. The operator may customize the function of key 222 in movement screen 200. Keys 222 have the ability to be programmed for specific types of functionality using whole integers or Boolean math and integers. For example, a key may be customized to carry out a function relating to movement of the positioner ("a movement function"). Some examples of movement functions are explained below.

For example, key 222 may be given a value which the operator wants to store and recall. The operator may actuate the function key, and then press start button 226, causing the positioner in processor 6 to move to an appropriate position.

Alternatively, key 222 may be given a selected value which the user wants to store and recall. However, instead of inputting just the value at the time of programming, the operator puts a "G" in front of the integer value. When the operator hits the "function" key, the machine immediately moves to that position. The "G" at the front tells the computer to move the positioner to the appropriate position without waiting for the operator to push start button 226.

Alternatively, the operator may program a key to perform a math operand at the beginning of the string such as +⅔. The machine will pick up either the value entered in the movement screen or the current position if no value is entered and perform a math string on that value, and will then wait for the operator to push start button 226, at which time the positioner moves to that position.

Alternatively, the operator may program key 222 to perform a math operand at the beginning of the string such as +⅔ and a G at the back of the string (+⅔G). The machine will pick up either the value entered in the movement screen or the current position if no value is entered and perform the math string on that value. The positioner will then move to that position, without the need for the operator to push start button 226.

Alternatively, the operator may program a sequence of numbers such as 12, 34, 18, 23G, in which case the stop will move through those values on sequential pressing of the functioned key until all movements are completed. The key will visually notify the operator that it is in a series of positions, and then visually notify the operator when the last set is complete.

When the operator is programming the function key, you may have the option of doing a "Push Program" or "Pattern Program". This will require the operator to enter the length of stop and then sequence of cuts requested. If the operator checks a "Kerf Option", the computer will calculate the kerf and subtract it from the stock length remaining. As the lengths that the operator wants to cut from the stop are entered, a visual on-screen indicator shows the pattern as it is built up and the remaining length will also be indicated.

Other options may be enabled by the program. For example, the keys may be selected for custom colors. The keys may either show the inputted function or may display a symbol or label. The keys may have visual keys as to whether they require actuation of start button 226 to initiate movement. The keys may be arranged in any order desired. Multiple screens of keys may be programmed and accessed through a toggle.

The program has the ability to generate custom lengths to distinct data files allowing user to link to multiple different data sets or to make changes in this link to accommodate changes in the subject data files. The program may have the ability to read inputs from devices such as a bar code scanner or a linear digital measuring device resulting in the creation of a cut list or a file opened command. The program may have the ability to print labels with bar code formats or other relevant information. The program may be configured for use on a touch screen monitor, and may include a virtual keyboard for data entry. The program may include a mathematical calculator in movement screen 200 which may be operated through keypad 230. The program may offer a multi-lingual option (English, Spanish, French, etc.) by pressing language button 32.

The disclosure set forth above may encompass one or more distinct inventions, with independent utility. Each of these inventions has been disclosed in its preferred form(s). These preferred forms, including the specific embodiments thereof as disclosed and illustrated herein, are not intended to be considered in a limiting sense, because numerous variations are possible. The subject matter of the inventions includes all novel and nonobvious combinations and subcombinations of the various elements, features, functions, and/or properties disclosed herein.

I claim:

1. A material processing system comprising
an apparatus including a processing path, a saw station located along the processing path, a positioner configured to push a trailing end of a work piece along the processing path toward the saw station, and
a computer connected to the apparatus programmed to provide a digital interface allowing an operator to control operation of the apparatus through the interface, the interface including a display screen having a set of keys, a key customizing field, and a numerical keypad field, each key being customizable for a particular application by touching the key customizing field and the numerical key pad field to affect a selected movement function of the positioner along the processing path.

2. The apparatus of claim 1, wherein the movement function assigned to a particular key indicates a target location along the processing path for the positioner to move to upon actuation of the key by the operator.

3. The apparatus of claim 1, wherein the movement function assigned to a particular key indicates a target location along the processing path for the positioner to move to upon actuation of the key and actuation of a start button by the operator.

4. The apparatus of claim 1, wherein the movement function assigned to a particular key indicates a target location along the processing path for the positioner to move the work piece to upon actuation of the key by the operator.

5. The apparatus of claim 1, wherein the movement function assigned to a particular key indicates a target location along the processing path for the positioner to move the work piece to upon actuation of the key and actuation of a start button by the operator.

6. The apparatus of claim 1, wherein the movement function assigned to a particular key indicates a math operand to be performed on a position number upon actuation of the key and actuation of a start button by the operator.

7. The apparatus of claim 1, wherein the movement function assigned to a particular key indicates a math operand to be performed on a position number upon actuation of the key by the operator.

8. The apparatus of claim 6, wherein the math operand includes an addition or subtraction function.

9. The apparatus of claim 1, wherein the movement function assigned to a particular key indicates a series of target locations along the processing path for the positioner to move to upon sequential actuation of the key by the operator.

10. The apparatus of claim 1, wherein the interface permits each key to be marked with a symbol indicating its customized function.

11. The apparatus of claim 1, wherein the interface permits toggling between multiple screens, each screen containing a set of customizable keys for use by the operator in carrying out a specific project type.

12. A method of cutting material comprising
providing an apparatus including a processing path, a saw station located along the processing path, a positioner configured to push a trailing end of a work piece along the processing path toward the saw station, and a controller connected to the apparatus programmed to provide a digital interface allowing an operator to control operation of the apparatus through the interface, the interface including a display screen having a set of keys, a key customizing field and a numerical key pad field, each key being customizable for a particular application by touching the key customizing field and the numerical key pad field to affect a selected movement function of the positioner along the processing path,
selecting a movement function for affecting movement of the positioner, and assigning the selected movement function to a key in the display field,
inputting data to the controller indicating a length of a work piece to be processed,
initiating the movement function on the positioner by actuating the key,
tracking location of the work piece relative to the saw station based on the location of the positioner along the processing path and the known length of the work piece, and
cutting the work piece at the saw station when the work piece has been pushed to an appropriate position for cutting the work piece into desired dimensions.

13. The method of claim 12, wherein the initiating step includes actuating a start key.

14. The method of claim 12, wherein the movement function includes a series of desired position movement numbers for the positioner.

15. The method of claim 12, wherein the movement function includes a math operand for performing a math function on a position number.

* * * * *